Sept. 10, 1935.   J. C. MacLACHLAN   2,013,859
MEAT PRODUCT FROM COOKED MEAT AND METHOD OF MAKING THE SAME
Filed Nov. 10, 1928   2 Sheets-Sheet 1

Inventor
John C. MacLachlan
By his Attorneys
Williamson
Reif & Williamson

Sept. 10, 1935.  J. C. MacLACHLAN  2,013,859
MEAT PRODUCT FROM COOKED MEAT AND METHOD OF MAKING THE SAME
Filed Nov. 10, 1928   2 Sheets-Sheet 2
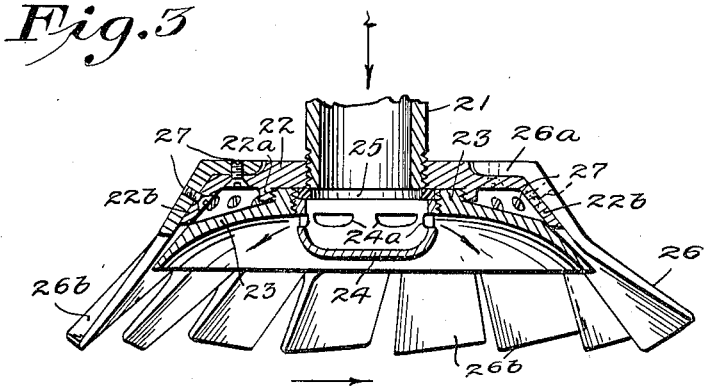
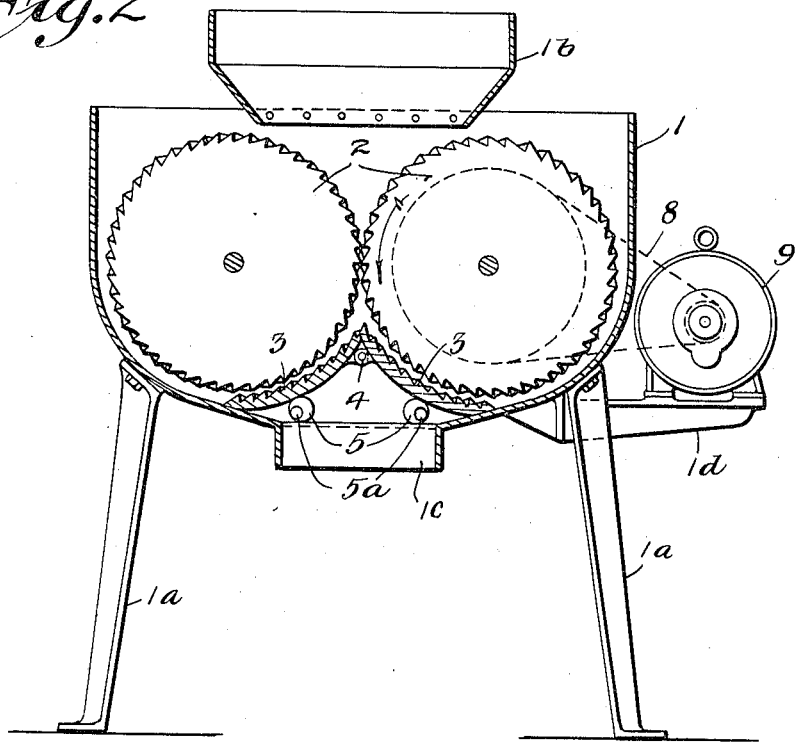

Patented Sept. 10, 1935

2,013,859

UNITED STATES PATENT OFFICE 2,013,859

MEAT PRODUCT FROM COOKED MEAT AND METHOD OF MAKING THE SAME

John C. MacLachlan, Chicago, Ill., assignor, by mesne assignments, to Albert P. Hunt, Chicago, Ill.

Application November 10, 1928, Serial No. 318,358

3 Claims. (Cl. 99—11)

This invention relates to a powdered meat product and the method of producing the same. While the product can be made from any kind of cooked meat and the method is applicable to any kind of cooked meat, it more particularly relates to a meat product and method of making the same from cooked fowl or cooked ham. It has long been recognized that a powdered meat product which would retain the flavor of the original cooked meat and would have good keeping properties was very desirable. The marketing of cooked meats has increased of late years and it is now very large. It is desirable to have a cooked meat in powdered form which could readily be used for making sandwiches and making soups and broths.

It is an object of this invention, therefore, to provide a powdered meat product which will have the flavor of the original cooked meat and which will have good keeping properties.

It is a further object of the invention to provide a method of producing a powdered meat product which comprises comparatively few steps and can be carried out at a reasonable expense.

It is still another object of the invention to provide a powdered meat product and method of making the same, which product is made by cooking the meat, separating the lean meat, grinding the lean meat, adding liquid, either milk, water or the extractives of the meat or some of any or all of the same, finely disintegrating the mixture and then separating the ground pulp into fine particles and rapidly drying the same.

It is more specifically an object of the invention to provide a powdered meat product and a method of making the same, which product is made by cooking the meat, separating the fat therefrom, coarsely grinding the meat, preparing a ground vegetable fat, mixing the ground meat and vegetable fat with a liquid, such as milk or water, finely disintegrating the mixture, and then separating and drying the same.

These and other objects and advantages of the invention will be fully set forth in the following description made in connection with the accompanying drawings, in which like reference characters refer to similar parts throughout the several views, and in which:—

Fig. 2 is a view in vertical section more or less diagrammatic of a pulping apparatus used in carrying out one step of the method, and Fig. 3 is a vertical section through a spraying head used in the method.

Figure 1:
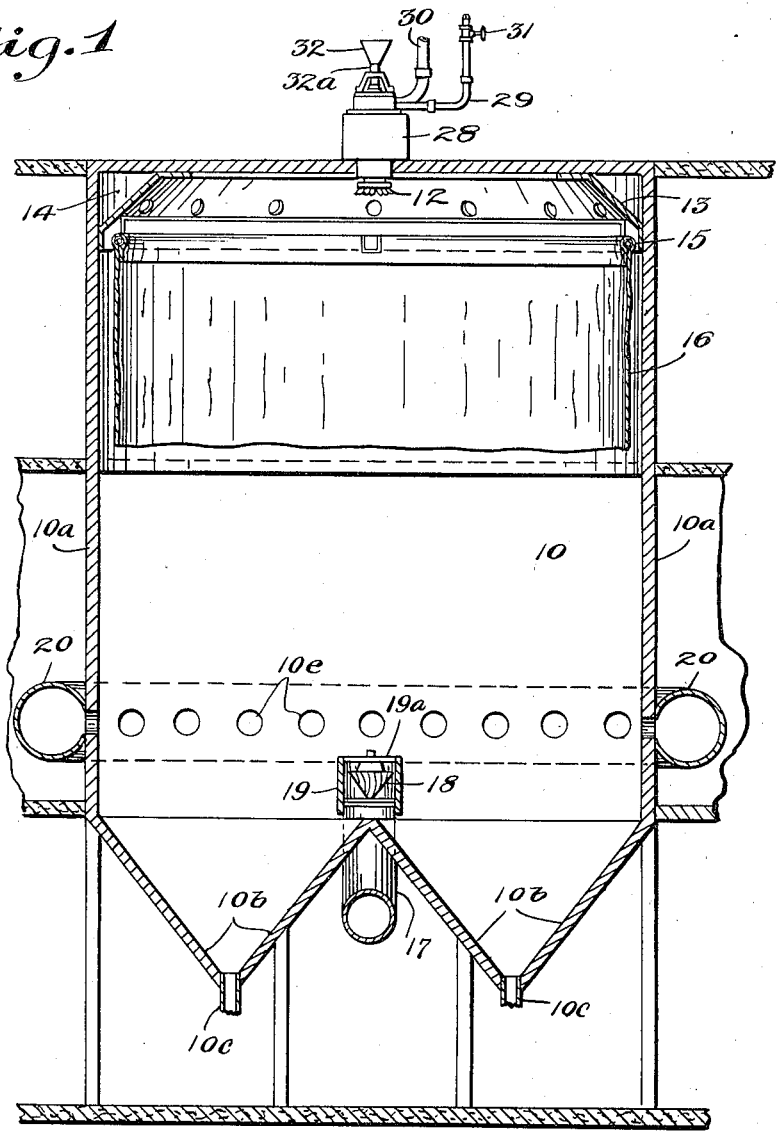
Fig. 1 is a vertical section through an apparatus generally called a drying cabinet in which part of the method is carried out.

In carrying out the present method to make the desired product, the meat, such as ham, beef or fowl, particularly chicken, is first cooked. This cooking preferably is done in a closed boiling vessel, such as used with the well-known fireless cooker or a steam pressure retort or cooker. After such cooking the meat is easily separated into the lean meat, fat meat, bone and the broth or soluble extractives which have cooked out of the meat. The lean meat is then ground in a machine which grinds it more or less coarsely, such as the well-known sausage grinding machine. In handling fowl such as chicken, some of the softer bone parts, particularly the marrow-carrying parts are also ground up with the lean meat. The fat is not used. In order to supply the fatty qualities or characteristics, some substance such as generally called vegetable fat is used. These substances include cocoa butter and the class of vegetable products now commonly used in making what is known as vegetable oleo. After the meat is thus ground in a rather coarse condition and has the consistency of ordinary sausage meat, a liquid is added. This liquid may be the broth in which the meat was cooked, care being taken to skim off all of the fat which might be contained in the liquid. The required seasoning is added and enough of the liquid is mixed with the ground meat to make a product which will readily flow.

In the next step this mixture of the ground meat and the liquid is passed through a pulping mill which grinds it to an exceedingly fine condition. While any suitable type of pulping mill may be used, in Fig. 1 of the drawings, a pulping mill or machine is illustrated which has been found to be suitable. This mill comprises an open-top container which is supported upon suitable legs Ia and having a hopper Ib thereabove through which material is fed to said container. The container I has at its central portion a pair of semi-cylindrical concaves 3. These concaves have partially cylindrical inner surfaces provided with a multiplicity of sharpened flutes or ribs. The concaves are provided with lugs hinged to a pivot 4 and may be adjusted by eccentrics 5 carried on shafts 5a which will project at one end of the machine and will be provided with suitable holding means not shown. The container I is longitudinally traversed by spaced shafts having secured thereto the grinding cylinders 2. These cylinders will have on their surfaces a multiplicity of ribs or flutes as shown, the same being sharpened at their outer edges and have their edges directed oppositely to the flutes of the concaves 3. The cylinders 2 are rotated as shown by the arrows in Fig. 1, the shafts upon which they are carried being provided with meshing gears (not shown), one of said shafts being driven by the belt 8 from the suitable motor 9 carried on bracket 1d secured to member 1. The member 1 also has at one end a discharge outlet 1c.

The mixture to be pulped may be placed in the hopper 6 and will be fed into member 1. The material is engaged by the surfaces of member 2 and carried therebetween and then between the same and the concaves 3. The mixture is ground and reground between the cylinders and the concaves until the required degree of fineness is obtained and it is then discharged through the discharge outlet 1c, which will be at one end of the container 1 and provided with suitable regulating means.

The pulp which has been ground to a high degree of fineness is now ready to be dried. While any suitable drying apparatus which will instantaneously dry the product in the presence of a heated drying medium may be used, in Figs. 1 and 3 one form of apparatus which has been found to be highly efficient in practice is illustrated. This apparatus comprises a cabinet 10 having the walls 10a, which cabinet may be either of angular shape in cross section, or of cylindrical shape. The cabinet is shown as having receiving hoppers or compartments 10b at its bottom with converging bottoms having discharge outlets 10c. The cabinet 10 has a top 10d through which projects the distributing apparatus 11 through which the material is fed and which comprises the rotating head 12 at its lower portion. An inclined wall 13 extends about the upper corner of the cabinet forming a chamber 14 through which some of the air passes, said wall having openings 13a therethrough communicating with chamber 14. A rod 15 is shown extending around the wall 10a adjacent its upper end from which depends a fabric or flexible curtain 16. The drying air is supplied at the bottom of the cabinet and substantially at the center thereof by a conduit 17 above which is a conical deflector 18 surrounded by a cylinder 19, which cylinder is open at its upper end, but which has a bar 19a across its top forming one of the bearings for the member 18. The cabinet 10 or the walls 10a thereof have a plurality of discharge openings 10e which communicate with a conduit 20 extending about said wall through which air and some of the dried material will be drawn.

The liquid being dried is discharged into the chamber 10 as stated, through the distributor 12 forming no part of the present invention. The distributor 12 is rotated at high speed preferably by a turbine motor and the same comprises a pipe or conduit 21 which extends centrally downward in the member 11 and is secured at its lower end by a threaded connection to a circular plate 22 which may be made of suitable metal such as brass. The plate has an inwardly extending annular flange 22a which is interiorly threaded and in which is secured the exteriorly threaded hub of the disk member 23 having a concave inner surface. The hub of the disk 23 is also interiorly threaded and a cup or shell 24 is threaded into said hub against a washer 25 which is held between the inner edge of said cup and the plate 22. The cup 24 has a plurality of laterally extending elongated openings 24a therethrough and these openings are disposed substantially in alinement with the concave surface of the disk 23. The plate 22 has an inwardly extending flange 22b at its outer edge and a plurality of blade members 26 are secured to the member 22 overlying the flange 22b, said blades having portions 26a extending across the top or rear side of the plate 22 and having their top or rear surfaces flush with the surface of said plate. The blades 26 diverge in a direction substantially in line with the surface of the disk 23 or when the head is disposed about a vertical axis in a downward and outward direction. The blades 26 as shown in Fig. 2 do not extend directly radially but are at a slight angle to the radii of member 22 or slightly tangential. The blades 26 have substantially flat portions 26b with substantially parallel inner and outer surfaces. The inner surfaces of the portions 26b are disposed quite close to the disk 23 at the edge thereof as shown in Fig. 4 and it will be noted that said blades are disposed at an angle to each other and at an angle to a circle concentric with the disk 23. The blades are thus offset relatively to each other so that air will pass between the blades in the rotation of the head. It will be noted that the space between the blades 26 or the portions 26b thereof extend inward of the edge of disk 23. The blades have straight edges which diverge somewhat outwardly and also have straight outer ends disposed at a slightly sharper angle to the forward edge of the blade and to the rearward edge. The inner surfaces of the portions 26b are somewhat distorted but substantially flat or very slightly convex. The blades 26 are each secured to the member 22 by a pair of screws 27 extending from the inner side of the disk 22 and having their heads countersunk therein.

The tube 21 extends upwardly into a casing 28 in which a driving means comprising a steam turbine is disposed having the steam inlet pipe 29 leading thereinto and the exhaust pipe 30 leading therefrom. Pipe 29 is shown as provided with the usual regulating valve 31. A hopper 32 is provided having a discharge conduit 32a which will deliver to pipe 21, which latter pipe is connected to the rotor of the turbine.

In carrying out this step of the method, the material, comprising the pulp mixture above described, will be delivered to the hopper 32. The head carried on member 21 will be rotated at high speed preferably about three or four thousand revolutions per minute, the rotation being in the direction of the arrow shown in Fig. 3. The pulp mixture is fed downward into the conduit 21 and passes into cup 24 and the same is thrown outwardly by the rotation of the head through the discharge openings 24a onto the surface of the disk 23. The material spreads over the surface of the said disk in a thin film and is rapidly thrown to the outer edge thereof. After the material leaves the outer edge of the disk 23 it is received on the inner surfaces of the blades 26b and moves outwardly on said blades. The disk and blades moving together, the peripherial speed at the outer edge of the disk and the surface of the blades adjacent thereto is of course the same and the material which is fluid is transferred to the blades without any appreciable impact or beating action. The liquid is distributed over the inner surface of the blades 26 and is thrown outwardly from the blades at the ends and the sides thereof. The material passes around the rear edges of the blades and is distributed substantially half way or slightly more on the outer surfaces of the blades. As the head is rotated the air passes between the portions 26b of the blades so that the films of the material thrown from the blades are separated by the films or layers of air passing between the blades, the blades, owing to the disposition of their surfaces, acting as a fan and driving a current of air outwardly and downwardly. This causes the current to move at high velocity and the material on the blades both at the inner and outer surfaces thereof is subjected to air currents moving at high velocity. The material on each blade is thus subjected to the air both at the inner and outer sides thereof, as is the film of material thrown from the blades. By this action of the air on the material an exceedingly fine division of the material is obtained, which division is, at the same time, obtained without any impact on the material. The division is obtained by throwing outwardly a multiplicity of films in different planes rather than by simply throwing out a conical film. The apparatus, therefore, will divide a much heavier and thicker layer or film than would a single conical disk. The material is distributed from the apparatus downwardly in an extremely fine shower and owing to the fact that the distributor creates quite an appreciable downwardly extending current, the majority of the material is impelled downwardly. Some of the material, of course, is thrown outwardly almost horizontally but the heaviest distribution is downward and near the center of the distributor.

As the material is thrown downwardly by the head 12 of the cabinet shown in Fig. 1, the hot air is directed upwardly in the cabinet by the deflector 18 and within a cylinder 19. This air is at the center of the cabinet and is thus in line with the heaviest distribution of material, which as stated, is near the center of the distributor. The air rising from cylinder 19 and the deflector 18 gradually extends outwardly and is delivered very effectively into the falling shower of finely divided or atomized material, which material is almost instantaneously dried and falls to the bottom of the cabinet. Hot air is also forced into the cabinet through openings 13a and passes downwardly through the material principally at the outer sides of the shower. The air is drawn through the cabinet through the conduit 20 and some of the lighter material is withdrawn with this air, which is run through dust collectors in which the material carried by the air is collected. The liquid is thus all removed from the projected material and the solid constituents of the meat are practically instantaneously dried in very fine particles and drop to the bottom of the cabinet or are collected in the dust collectors. The material is taken from the bottom of the cabinet and dust collectors and the same forms a highly desirable powdered meat product. The product retains the flavor of the original cooked meat and has all of the nutritive constituents of the meat, even including the solids of the extractives. As stated, milk can be added to the ground meat, as well as the extracted juices, skim milk preferably being used. The amount of vegetable material added is about one half to one ounce to the pound, this being varied according to the kind of meat. More of this will be used with ham than with beef or chicken. The ground lean meat and vegetable fat added are coated by the milk or liquid added to the mixture, particularly in the pulping operation and when the pulp is dried, a homogeneous product results, the particles of fiber being more or less coated by the particles of milk or other liquid. The dried product is non-hygroscopic and can be packed in containers, whether absolutely air tight or not, and will keep indefinitely without becoming rancid. In practice, the material will be packed in closed containers, preferably of metal.

From the above description it is seen that applicant has provided a very desirable and useful product and one produced by a simple and inexpensive method. The dried product has a high degree of utility in making soups, broths and gravies and is very desirable for making sandwiches. In the latter use the dried product is preferably mixed with some fluid or semi-fluid material, such as salad dressing, or the same can merely be mixed with milk or water. Cooked ham, when dried by the present process is a very satisfactory product for sandwiches. The ham used is preferably smoked and cured before being cooked. When fowl is dried and some of the softer bone portions used, a fine flavor is given to the product.

It will, of course, be understood that various changes may be made in the form, details, arrangement and proportions of the apparatus and in the steps and sequence of steps of the method, without departing from the scope of applicant's invention, which, generally stated, consists in a method and apparatus capable of carrying out the objects above set forth, such as disclosed and defined in the appended claims.

What is claimed is:—

1. The process of producing a dry powdered meat which consists in cooking the meat, separating the lean meat from the fat and bone portions, grinding the lean meat, adding a liquid and a small amount of ground vegetable fat to the ground meat, finely disintegrating the resulting mixture and then separating and rapidly drying the material in a gaseous medium to form a powder.

2. The process of producing a dry powdered meat which consists in cooking the meat in liquid, separating the lean meat from the fat and bone, grinding the lean meat, mixing the ground meat with milk, adding ground vegetable fat, pulping the resulting mixture to a high degree of fineness and then separating said mixture into finely divided particles and rapidly drying the same.

3. A powdered meat product comprising the cooked fiber of the meat in finely divided form, the solids of the cooked extractives in finely divided form, a small portion of finely divided vegetable fat and finely divided particles of milk.

JOHN C. MacLACHLAN.